United States Patent [19]

Guichard

[11] Patent Number: 4,622,684
[45] Date of Patent: Nov. 11, 1986

[54] DEVICE FOR RECOGNITION OF BINARY WORDS

[75] Inventor: Jean-Louis V. Guichard, Paris, France

[73] Assignee: Societe Anonyme de Telecommunications, France

[21] Appl. No.: 577,037

[22] Filed: Feb. 6, 1984

[30] Foreign Application Priority Data

Feb. 8, 1983 [FR] France ............................... 83 01920

[51] Int. Cl.$^4$ .................... H04L 7/00; G08C 19/00
[52] U.S. Cl. .................... 375/116; 340/825.68
[58] Field of Search ............ 370/100; 340/146.2, 340/825.62, 825.68; 375/114, 116

[56] References Cited

U.S. PATENT DOCUMENTS

| | | | |
|---|---|---|---|
| 3,472,956 | 10/1969 | Glasson | 375/111 |
| 3,925,764 | 12/1975 | Wiesenewsky | 340/825.68 |
| 3,959,587 | 5/1976 | Allias | 375/113 |
| 3,990,049 | 11/1976 | Wirth | 375/116 |
| 4,035,601 | 7/1977 | Isaacs | 375/116 |
| 4,161,719 | 7/1979 | Parikh et al. | 375/116 |
| 4,298,987 | 11/1981 | Stattel et al. | 375/116 |

OTHER PUBLICATIONS

Yven Madec, Caracteristiques Genenerales D'Un Equipement de Multiplexage Numerique Du Second Order TNM 1-2, Cables et Transmission, vol. 29, pp. 261-265, Dec., 1975.

Primary Examiner—Douglas W. Olms
Assistant Examiner—Frank M. Scutch, III
Attorney, Agent, or Firm—Jacobs & Jacobs

[57] ABSTRACT

The device according to the invention is useful for recognizing binary locking words in a digital train. It comprises six flip flops connected to an AND gate for recognizing the first six bits of the locking words. The first five flip flops are connected to an AND gate for recognizing the last five bits of the locking words. A seventh flip flop makes it possible to confirm and memorize the identification of the first six bits of the locking words and an AND gate, connected between the sixth and the seventh flip flops, ensures erasure of the memorization of the first identification.

5 Claims, 3 Drawing Figures

DEVICE FOR RECOGNITION OF BINARY WORDS

BACKGROUND OF THE INVENTION

The present invention relates to a device for the recognition of binary locking words in a digital train.

Such devices are applied in particular to demultiplexers with high output, for example 34 Mbits/s, 140 Mbits/s.

In multiplexed digital trains, the frames are separated from one another by frame locking words. A frame may, for example, comprise four sectors of 96 groups of 4 binary elements. In this case, the frame locking word associated with each frame occupies the first 10 bits of the first three groups of the first sector, two being in reserve. Demultiplexing includes the identification at reception of each of the trains and each of the frames and the frame locking words in the trains received.

Notice G 742 of the CCITT recommends, as frame locking word, or signal, the word 1111010000.

At reception, it is necessary to be able to identify such a word with certainty, without, however, wasting too much time in recognizing and decoding such a long word.

It is already known to identify such a word of 10 binary elements with the aid of a device incorporating ten flip flops mounted in registers.

However, such a quantity of flip flops prohibits recognition of the word on a component of very small dimensions, such as a chip.

It is therefore an object of the present invention to reduce the number of logic elements in the devices employed heretofore.

SUMMARY OF THE INVENTION

To this end, the present invention relates to a device for the recognition of binary locking words in a digital train, which comprises means adapted to identify a first part of the locking words, means for confirming and memorizing this identification, means adapted to identify a second part of the locking words, said first and second parts of the locking words overlapping, means for erasing said memorization, and means for confirming, upon erasure of said memorization, the identification of all the locking words.

In a preferred embodiment of the device according to the invention, the locking words comprise ten binary elements and the means for identifying the first part of the locking words comprise six flip flops connected to a first AND gate, the means for confirming and memorizing this identification comprise a seventh flip flop, the means for identifying the second part of the locking words comprise the first five flip flops of the means for identifying the first part of the words and a second AND gate to which they are connected, the erasure means comprise a third AND gate connected between the sixth flip flop of the means for identifying the first part of the locking words and the seventh flip flop, and the means for identifying all the locking words comprise a fourth AND gate connected to the seventh flip flop and to the second AND gate.

Thanks to the invention, identification of the frame locking words recommended by Notice G 742 of the CCITT is therefore effected with seven flip flops, and not ten.

BRIEF DESCRIPTION OF THE DRAWINGS

The invention will be more readily understood on reading the following description with reference to the accompanying drawings, in which.

DETAILED DESCRIPTION OF A PREFERRED EMBODIMENT OF THE INVENTION

In the example described hereinbelow, it has been considered, by way of indication, but in non-limiting manner, that the frame locking word was the word 1111010000 recommended by G 742 of the CCITT.

Figure 1:
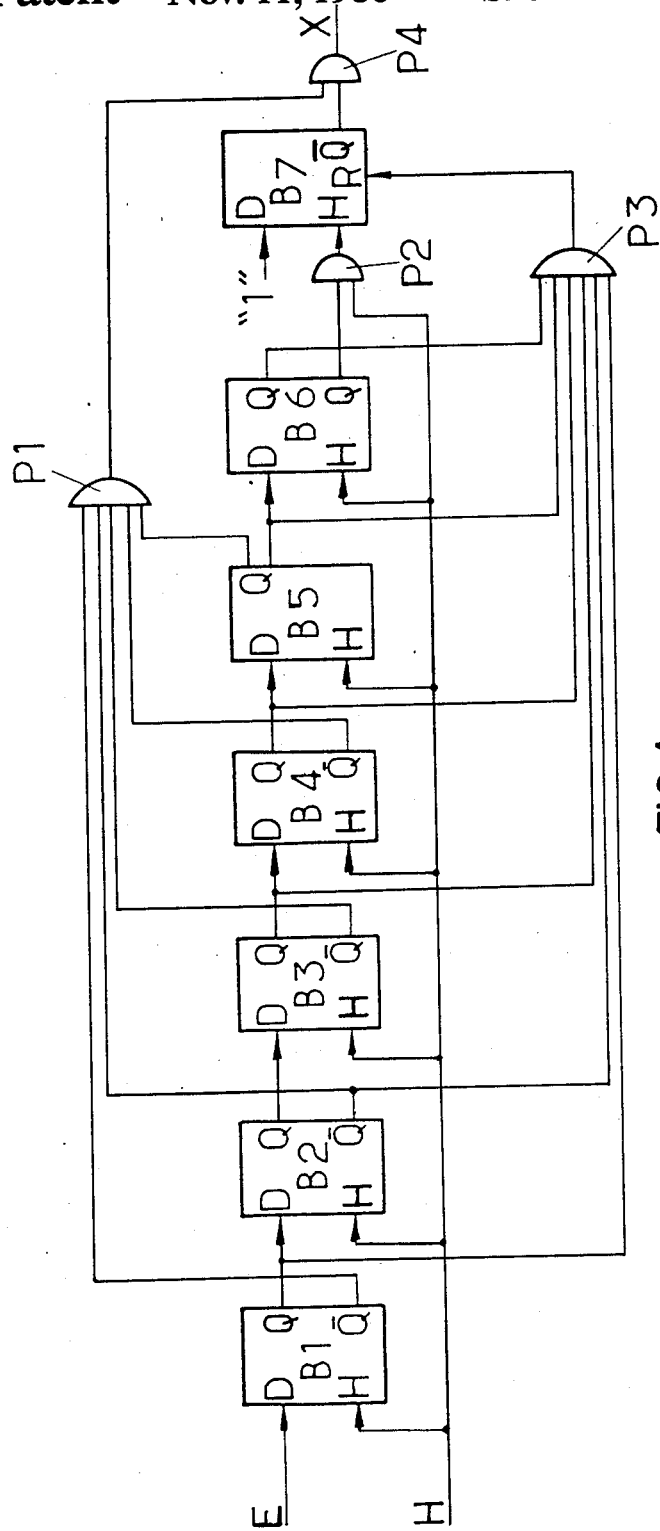
FIG. 1 shows the logic diagram of the device of the invention.

Referring now to the drawings, the device of FIG. 1 comprises seven flip flops $B_1$–$B_7$ of known type D (data flip-flops), with two inputs D and H; they are synchronized by a binary clock signal of period equal to a binary time (FIG. 2) received on their input H, and possessing a direct output Q and an inverter $\overline{Q}$. The clock signal is a periodic square signal, in state 0 on one half-period and in state 1 on the other half-period of each period. The signal at the output Q of the flip flops may be synchronized both on the leading edge and on the trailing edge of the clock signal, and in the example in question, it is synchronized on the trailing edge, i.e. at the moment of this trailing edge, the signals at Q and at D are the same. The input D of the first flip flop $B_1$ receives the binary signal E from the multiplexed digital trains in which the frame locking words must be recognized, and the inputs D of the following five flip flops $B_2$–$B_6$ are connected to the outputs Q of the first five flip flops $B_1$–$B_5$, respectively.

The inverter outputs $\overline{Q}$ of the first four flip flops $B_1$–$B_4$ and the output Q of the flip flop $B_5$ are connected to the inputs of an AND gate $P_1$. The direct outputs Q of the flip flops $B_1$, $B_3$, $B_4$, $B_5$ and $B_6$ and the inverter output $\overline{Q}$ of the flip flop $B_2$ are connected to the inputs of an AND gate $P_3$. The inverter output $\overline{Q}$ of the flip flop $B_6$ is connected to an input of an AND gate $P_2$ of which the other input receives the clock signal. The clock input H of the flip flop $B_7$ is connected to the output of the AND gate $P_2$ and its other input D receives a logic signal 1. The output of the AND gate $P_3$ is connected to the reset input R of the flip flop $B_7$. The output of the AND gate $P_1$ and the inverter output of the flip flop $B_7$ are connected to the inputs of an AND gate $P_4$.

Figure 2:
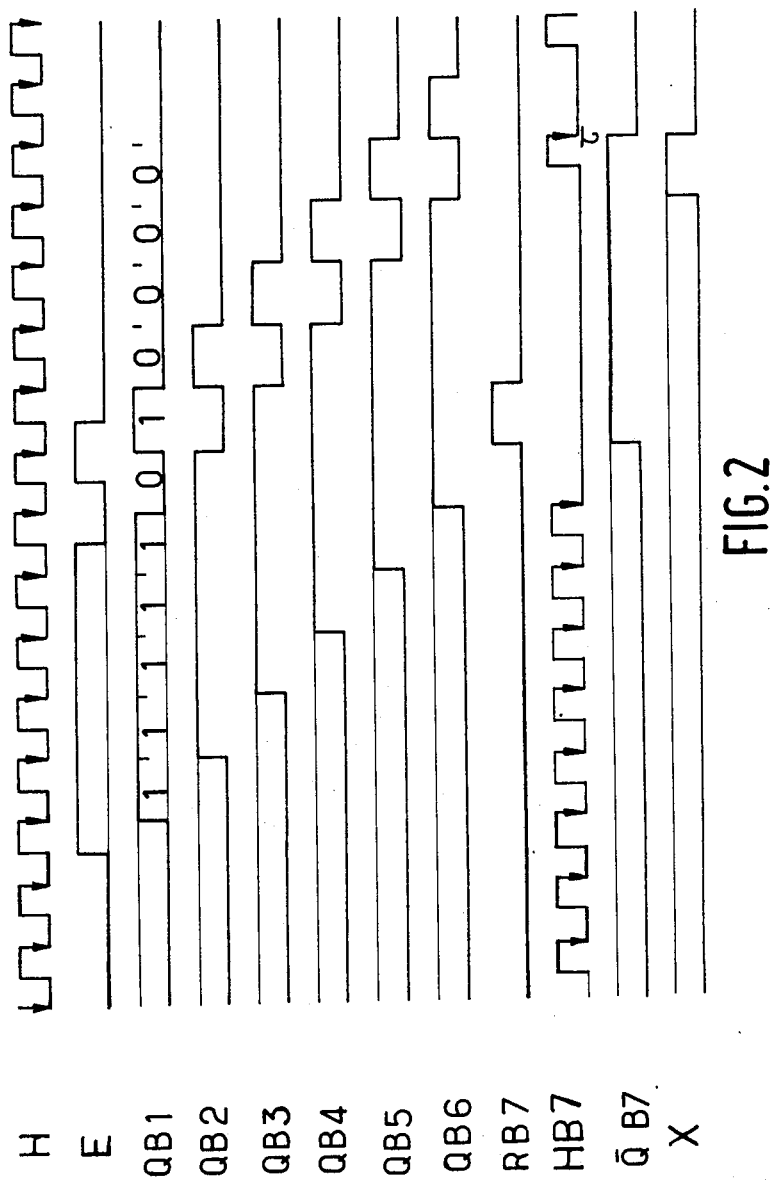
FIG. 2 shows the timing chart of the operation of the device of FIG. 1.

Let us now examine how the device which has just been described by its structure, operates, with reference to FIG. 2. Let H be the clock signal and E the binary signal received on the input D of the flip flop $B_1$. In reality, it is not known when a frame locking word begins. Let the signal E comprise, after a rising edge, five 1's, one 0 and one 1 before a trailing edge. After the first 1, the reader will have recognized the word of Notice G 742 of the CCITT.

Let us assume that, when four 1's followed by one 0 and one 1have been identified, it has been recognized that the word had begun.

The output Q of $B_1$ will become identical to E and will pass to the high state during the first trailing edge of H following the passage to the high stade of E. This is what has been shown by the signal $QB_1$. At the moment of passage to the high state of QB$_1$, the input D of B$_2$ sees the output QB$_1$, but the latter is not yet in the high state. Therefore the output Q of B$_2$ will pass to the high state during the following trailing edge of H. And this applies to all the outputs Q of the flip flops B$_2$-B$_6$. Consequently, the signals QB$_1$-QB$_6$ are the same but shifted with respect to one another by a clock period, or a binary time.

When the output of the AND gate P$_3$—signal RB$_7$ of FIG. 1—is in the high state, the signals QB$_1$, $\overline{QB}_2$, QB$_3$, QB$_4$, QB$_5$ and QB$_6$ are also in the high state. During this binary time, the six direct outputs Q of the flip flops B$_6$, B$_5$, B$_4$, B$_3$, B$_2$, B$_1$ are respectively 1, 1, 1, 1, 0, 1, respectively representing the first six binary elements of the frame locking word.

When the direct output Q of B$_6$ is in the low state, or 0, its inverter output $\overline{Q}$ is in the state 1, and the output of the AND gate P$_2$ reproduces the clock signal H. At the moment when RB$_7$ passes to the high state, QB$_6$ is already in the high state, i.e. there is no longer any clock signal at the input H of the flip flop B$_7$. Therefore, at the moment when the signal RB$_7$ passes to the high state, the flip flop B$_7$ flips to the high state on its inverter output $\overline{QB}_7$, in fact thanks to the AND gate P$_3$, and remains on this state, which may be called state of memorization of the identification of the first six elements of the locking word, until the clock signal reappears at the input H of B$_7$, i.e. $\overline{QB}_6$ passes to 1, i.e. until QB$_6$ passes to 0.

The flip flop B$_7$, taking into account the structure of the clock signal H, therefore re-flips to the low state on its inverter output during the trailing edge of the clock signal following passage to the low state of QB$_6$, or at instant $\tau$, and the memorization is erased. In this respect, it may therefore be said that the AND gate P$_2$, which receives the signal $\overline{QB}_6$, performs a role of erasure which makes it possible, in the event of poor detection, not to disturb the device. At instant $\tau$ again, the inputs of the AND gate P$_1$ are respectively $\overline{QB}_1=1$, $\overline{QB}_2=1$, $\overline{QB}_3=1$, $\overline{QB}_4=1$, $\overline{QB}_5=1$, i.e. the gate P$_1$ identifies the states 10000 of the direct outputs Q of the flip flops B$_5$, B$_4$, B$_3$, B$_2$, B$_1$, i.e. the last five bits of the frame locking word.

Finally, at the moment when the inverter output of the flip flop B$_7$ passes to the high state, the first six bits of the frame locking word are identified, and memorised up to the moment when the inverter output of the flip flop B$_7$ re-flips to the low state, when the last five bits of the frame locking word are identified. In other words, it may be considered that the locking word comprises a first part of six bits and a second part of five bits, the two parts having the sixth bit of the word in common, that identification of the first part is confirmed and memorized until the second part is in turn identified. Overlapping of the two parts of the word ensures continuity of the identification which, if this were not so, would not be ensured without error.

The output X of the AND gate P$_4$, which receives on its inputs the output signal from the AND gate P$_1$ and the signal from the inverter output $\overline{Q}$ of the flip flop B$_7$, is therefore in the high state during the last bit of the locking word and passes to the low state again at instant $\tau$, at the end of the locking word. It therefore makes it possible to confirm the identification of the whole of the frame locking word.

Figure 3:
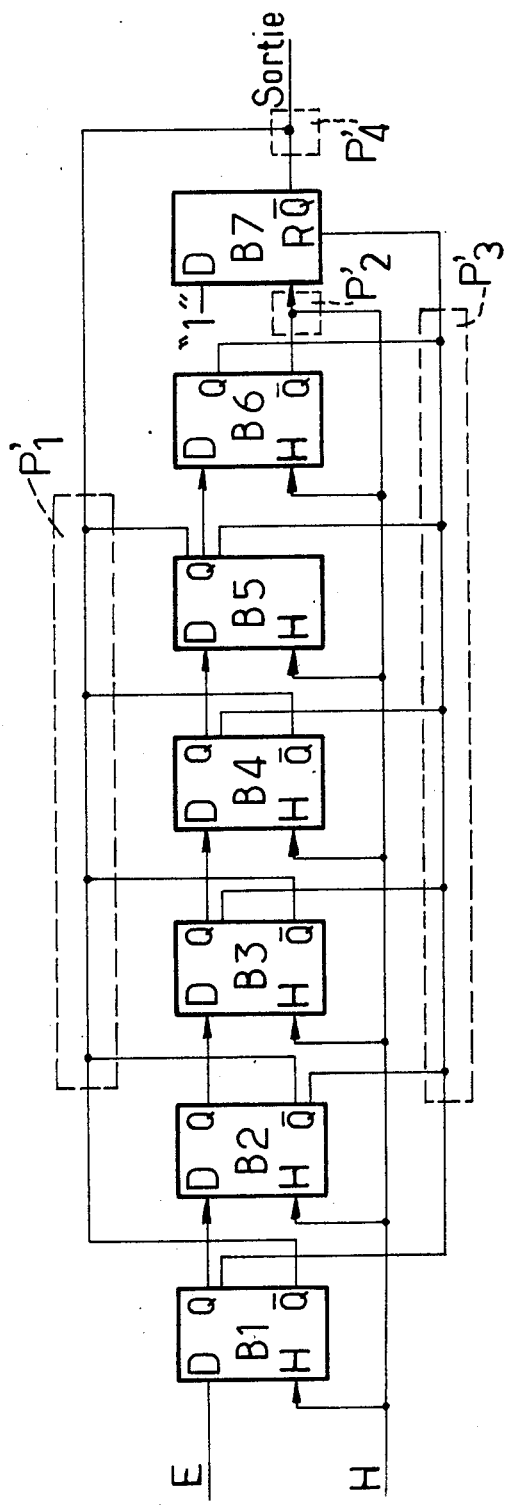
FIG. 3 shows a variant in STL technology of the diagram of FIG. 1.

The device of FIG. 3 is equivalent to that of FIG. 1 except that it is made in accordance with STL (Schotky Transistor Logic) technology and the AND gates P$_1$, P$_2$, P$_3$, P$_4$ are replaced by current nodes P'$_1$, P'$_2$, P'$_3$, P'$_4$.

The device of the invention may be made in accordance with any other technology which promotes, in particular, integration.

In general, the device according to the invention may allow identification of frame locking words other than the one recommended by Notice G 742 of the CCITT. Thus, if these words comprise an even number 2n of binary elements, the device of the invention comprise n+2 flip flops in cascade, the first (n+1)'s being connected to the inputs of a first AND gate adapted to identify the first (n+1) binary elements of the locking words, the flip flop of order (n+2) confirming and memorizing this identification, the first n flip flops being connected to the inputs of a second AND gate adapted to identify the last n binary elements of the word, a third AND gate, connected between the flip flops of orders (n+1) and (n+2), being adapted to erase said memorization, and the flip flop of order n+2 and the second AND gate being connected to the inputs of a fourth AND gate adapted to confirm, upon erasure of said memorization, the identification of the frame locking word as a whole.

But if these words comprise and odd number 2p+1 of binary elements, the device of the invention comprises (p+2) flip flops in cascade, the first (p+1)'s being connected to the inputs of a first AND gate adapted to identify the first (p+1) binary elements of the locking word, the flip flop of order (p+2) confirming and memorizing this identification, the first (p+1) flip flops being connected to the inputs of a second AND gate adapted to identify the last (p+1) binary elements of the word, a third AND gate, connected between the flip flops of orders (p+1) and (p+2), being adapted to erase said memorization, and the flip flop of order (p+2) and the second AND gate being connected to the inputs of a fourth AND gate adapted to confirm, upon erasure of said memorization, the identification of the frame locking word as a whole.

What is claimed is:

1. A device for recognition of a binary locking word in a digital train, which comprises means for identifying a first part of said locking word, means for confirming and memorizing this identification, means for identifying a second part of said locking word, said first and second parts of said locking word overlapping, means for erasing said memorization, and means for confirming, upon erasure of said memorization, the identification of the entirety of said locking word.

2. The device of claim 1, wherein said locking word comprise ten binary elements and the means for identifying the first part of said locking word comprise six flip flops connected to a first AND gate, the means for confirming and memorizing this identification comprise a seventh flip flop, the means for identifying the second part of said locking word comprise the first five flip flops of the means for identifying the first part of said locking word and a second AND gate to which they are connected, the erasure means comprise a third AND gate connected between the sixth flip flop of the means for identifying said first part of said locking word and the seventh flip flop, and the means for identifying the entirety of said locking word comprise a fourth AND gate connected to the seventh flip flop and to the second AND gate.

3. The device of claim 2, wherein said locking word is 1111010000, the first AND gate is connected respectively to the direct outputs of the first flip flop and of the last three flip flops and to the inverter output of the second flip flop of the group of flip flops for identifying the first part of said locking word, and the second AND gate is connected respectively to the inverter outputs of the first four flip flops and to the direct output of the fifth flip flop of the group identifying the second part of said locking word.

4. The device of claim 2, wherein said flip flops are flip flops of type D.

5. The device of claim 1, wherein said means for identifying the first part and the second part of said locking word and said means for confirmation and memorization comprise flip flops of STL type.

* * * * *